(12) United States Patent
Legge et al.

(10) Patent No.: US 11,615,571 B2
(45) Date of Patent: *Mar. 28, 2023

(54) SYSTEMS CONFIGURED TO CONTROL DIGITAL CHARACTERS UTILIZING REAL-TIME FACIAL AND/OR BODY MOTION CAPTURE AND METHODS OF USE THEREOF

(71) Applicant: Capital One Services, LLC, McLean, VA (US)

(72) Inventors: Amanda Legge, Los Altos, CA (US); Chen Shen, Albany, CA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/718,016

(22) Filed: Apr. 11, 2022

(65) Prior Publication Data

US 2022/0270315 A1  Aug. 25, 2022

Related U.S. Application Data

(63) Continuation of application No. 17/087,872, filed on Nov. 3, 2020, now Pat. No. 11,302,051, which is a (Continued)

(51) Int. Cl.
*G06T 13/40* (2011.01)
*G06F 3/01* (2006.01)

(52) U.S. Cl.
CPC .............. *G06T 13/40* (2013.01); *G06F 3/011* (2013.01)

(58) Field of Classification Search
CPC .. G06T 13/40; G06F 3/005; G06F 3/011–013; G06F 3/04815; A63F 13/212; A63F 2300/5553; A63F 2300/8082
See application file for complete search history.

(56) References Cited

U.S. PATENT DOCUMENTS

| 10,861,212 B1* | 12/2020 | Legge | G06F 3/011 |
| 11,302,051 B2* | 4/2022 | Legge | H04R 1/1041 |
| 2018/0052512 A1* | 2/2018 | Overly | G06F 3/165 |

* cited by examiner

*Primary Examiner* — Stephen G Sherman
(74) *Attorney, Agent, or Firm* — Greenberg Traurig, LLP (57) ABSTRACT

In some embodiments, the present disclosure provides an exemplary technically improved system and method for controlling the body movements and facial expressions of a digital character in real time by using: a body-motion capture system comprising a headset configured to be worn on a head of a user and comprising controllers and sensors that can be used to track at least one head or body motion of the user (including arms and hands); and correspondingly control at least one head or body motion (including arms and hands) of a digital character in real time based, at least in part, on the captured motion data; a mobile computing device configured to track and capture facial expression data relating to at least one facial expression of the user, and use at least that data to correspondingly control at least one facial expression of the digital character in real time; a microphone configured to capture an audio output of the user, and control an audio output of the digital character in real-time based, at least in part, on the captured audio output; an integration computing device configured to integrate the audio output, the motion data and the facial expression data to control the audio output, the motion, and the facial expression of the digital character; a vest configured to be worn on an body of the user and a structural member attached to the vest and configured to hold the mobile computing device at a predetermined distance from a face of the user so that the mobile computing device can track and capture the at least one facial expression of the user.

20 Claims, 5 Drawing Sheets

Related U.S. Application Data continuation of application No. 16/725,762, filed on Dec. 23, 2019, now Pat. No. 10,861,212.

SYSTEMS CONFIGURED TO CONTROL DIGITAL CHARACTERS UTILIZING REAL-TIME FACIAL AND/OR BODY MOTION CAPTURE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to systems configured to control digital characters (e.g., avatars) utilizing real-time facial and/or body motion capture and methods of use thereof.

BACKGROUND OF TECHNOLOGY

Existing motion tracking and/or motion capture systems may include the use of live actors and puppets or require the use of expensive and specialized equipment beyond the reach of the average consumer. Existing systems may also be typically unable to accurately and closely capture both the facial expressions and body movements of a user in a seamless way to animate and control the facial expressions and body movements of a digital character in real time.

SUMMARY OF DESCRIBED SUBJECT MATTER

In some embodiments, the present disclosure provides an exemplary technically improved kit comprising: a body-motion capture system comprising: a headset configured to be worn on a head of a user; at least one motion-detection sensor located at a predetermined distance from the user to track at least one head or body motion of the user; at least one controller configured to control at least one head or body motion of a digital character; where the body-motion capture system is configured to: track and capture motion data relating to at least one head or body motion of a user; and control at least one head or body motion of a digital character in real time based, at least in part, on the captured motion data; where the at least one head or body motion of the digital character corresponds to the at least one head or body motion of the user; a mobile computing device configured to: track and capture facial expression data relating to at least one facial expression of the user, and control at least one facial expression of the digital character in real time based, at least in part, on the captured facial expression data; where the at least one facial expression of the digital character corresponds to the at least one facial expression of the user; a microphone configured to: capture an audio output of the user, and control an audio output of the digital character in real-time based, at least in part, on the captured audio output; where the audio output of the digital character corresponds to the audio output of the user; an integration computing device that is configured to integrate the audio output, the motion data and the facial expression data to control the audio output, the motion, and the facial expression of the digital character; a vest configured to be worn on an body of the user; and a structural member attached to the vest; where the structural member is configured to hold the mobile computing device at a predetermined distance from a face of the user so that the mobile computing device can track and capture the at least one facial expression of the user.

In some embodiments, the present disclosure provides an exemplary technically improved method comprising: receiving motion data relating to at least one head motion of a user from a headset and from at least one sensor configured to track and capture at least one motion of a head of a user; receiving motion data relating to at least one body motion of a user from at least one controller and from at least one sensor configured to track and capture at least one motion of a body of the user; receiving facial-expression data relating to at least one facial expression of a user from a mobile computing device configured to track and capture at least one facial expression of the user; receiving audio output from a microphone configured to capture an audio output of a user; integrating the received head and body-motion data and facial-expression data to control at least one head, body motion, and facial expression of a digital character in real time based, at least in part, on the received motion and facial expression data such that the at least one head, body motion, or facial expression of the digital character corresponds to the at least one head, body motion, or facial expression of a user; and integrating the received audio output to control an audio output of the digital character in real-time based, at least in part, on the received audio output; such that the audio output of the digital character corresponds to the audio output of a user.

In some embodiments, the present disclosure provides an exemplary technically improved kit comprising: a body-motion capture system comprising: a headset configured to be worn on a head of a user; at least one motion-detection sensor located at a predetermined distance from the user to track at least one head or body motion of the user; at least one controller configured to control at least one head or body motion of a digital character; where the body-motion capture system is configured to: track and capture motion data relating to at least one head or body motion of a user; and control at least one head or body motion of a digital character in real time based, at least in part, on the captured motion data; where the at least one head or body motion of the digital character corresponds to the at least one head or body motion of the user; a mobile computing device configured to: track and capture facial expression data relating to at least one facial expression of the user, and control at least one facial expression of the digital character in real time based, at least in part, on the captured facial expression data; where the at least one facial expression of the digital character corresponds to the at least one facial expression of the user; a microphone configured to: capture an audio output of the user, and control an audio output of the digital character in real-time based, at least in part, on the captured audio output; where the audio output of the digital character corresponds to the audio output of the user; an integration computing device that is configured to integrate the audio output, the motion data and the facial expression data to control the audio output, the motion, and the facial expression of the digital character; and an apparatus worn on the body of the user and configured to hold the mobile computing device at a predetermined distance from a face of the user so that the mobile computing device can track and capture the at least one facial expression of the user regardless of the movement of the user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a", "an", and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," pertains to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "user" shall have a meaning of at least one user.

As used herein, the term "headset" or the like, may refer to any portable electronic device that may or may not be enabled with body tracking functionality and that may be worn or mounted on the head of a user. For example, a headset can include, but is not limited to, a head-mounted display, virtual reality headset, or any other reasonable headset that may be enabled with body tracking functionality. A non-limiting example of a headset may include an Oculus Rift™ headset which is manufactured by Oculus VR (owned by Facebook Technologies LLC, CA)

As used herein, the term "mobile computing device" or the like, may refer to any portable electronic device that may or may not be enabled with facial expression and motion tracking functionality (e.g., Augmented Reality Kit™, ARKit™, or the like by Apple Inc., CA) including relevant software and hardware. For example, a mobile computing device can include, but is not limited to, a mobile phone, Smartphone, or any other reasonable mobile electronic device enabled with facial expression and motion tracking functionality. A non-limiting example of a mobile computing device may include an iPhoneX™ manufactured by Apple Inc., CA.

As used herein, the term "integration computing device" or the like, may refer to any electronic computing device that is able to among other things receive and process, audio, body, and facial expression and motion capture information and data to control the audio, body, and facial expression and motion of a digital character. For example, an "integration computing device" may include gaming laptops or computers and may or may not include software or applications for rendering or controlling digital characters such as the UNITY™ (Unity Technologies, CA) application. In some embodiments, the exemplary integration computing device may also include software or applications for operating, calibrating, and/or configuring the headset, controllers, and/or sensors.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints. A non-limiting example of software may include an Oculus Rift™ application package or software programs.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1A:
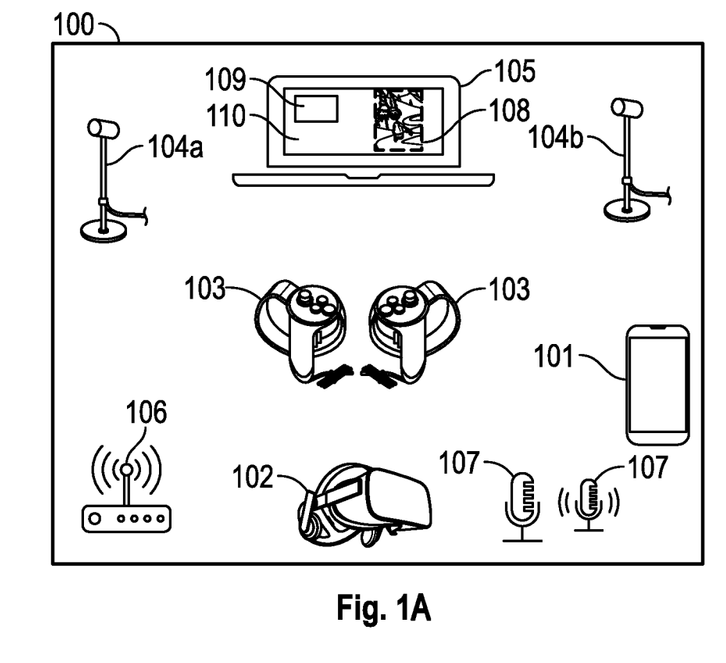
FIGS. 1A, 1B, 2A, 2B, 3A, and 3B depict one or more schematic flow diagrams, and/or pictures that are illustrative of some exemplary aspects of at least some embodiments of the present disclosure.
Figure 1B:
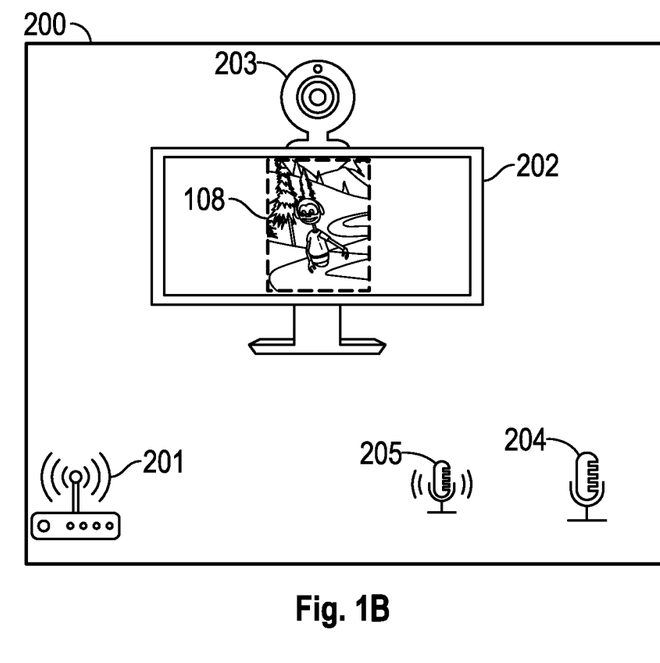

In accordance with one or more embodiments of the present disclosure, FIG. 1A illustrates a block diagram of an exemplary User Station 100 and FIG. 1B illustrates a block diagram of an exemplary Audience Station 200.

In some embodiments, referring to FIGS. 1A and 1B, a user may operate the system from a User Station 100. The User Station 100 may be physically separated from an audience that is located in an Audience Station 200 such that the user may be invisible to the audience. For example, the User Station 100 and the Audience Station 200 may be typically located in different rooms such that the user may not able to physically see the audience or the Audience Station 200, and such that the audience may not able to physically see the user or the User Station 100. For example, the Audience Station 200 and the User Station 100 may be in different rooms of the same building, or may be located at a large distance from each other, such as in different cities or countries.

As shown in FIG. 1A, the User Station 100 may include a mobile computing device 101 that includes an application, software or functionality that may be capable of tracking and capturing the facial expressions and motion of a user to control a digital character in real time. In some embodiments, mobile computing device 101 may include computing devices that typically connect using a wireless communications medium such as cell phones, smart phones, pagers, radio frequency (RF) devices, infrared (IR) devices, CBs, integrated devices combining one or more of the preceding devices, or virtually any mobile computing device that may use an application, software or functionality to track and capture the facial expressions and motion of a user to control a digital character in real time. A non-limiting example of a mobile computing device in accordance with one or more embodiments of this disclosure may include is an iPhone X™ that may include an ARKit™ app (both by Apple Inc., CA).

As shown in FIG. 1A, the User Station may also include a headset 102, controllers 103, and sensors 104a and 104b that may be capable of tracking and capturing the body motion of a user, who may be operating the controllers and wearing the headset, to control the body motion (including hand movements) of a digital character in real time. A non-limiting example of headset 102, controllers 103, and sensors 104a and 104b may include an Oculus Rift™ virtual reality headset, controllers, and sensors (Oculus VR).

As shown in FIG. 1A, the User Station 100 may also include an exemplary integration computing device 105 that may include a software program that allows the rendering and control of digital characters. For example, the integration computing device 105 may be a desktop computer, gaming laptop, PDA, tablet or other computing device. The software program that allows the rendering of digital characters may include the UNITY™ software program or application (Unity Technologies, CA). In some embodiments, the integration computing device 105 may also include a program or an application to configure and operate the headset 102, controllers 103 and sensors 104a and 104b which may be electronically connected to the integration computing device 105 either physically or wirelessly. The headset 102, controllers 103, and sensors 104a and 104b, may also be calibrated and configured through an application or program on the integration computing device 105. The integration computing device 105 may further include a user interface/electronic visual display that is configured to inter alia, allow the user to see the audience in-real time, and/or to see the digital character as controlled by the user and displayed in real time to the audience.

As shown in FIGS. 1A and 1b, the User Station 100 may further include a transmitter 106 that may be able to send relevant signals to a receiver 204 in the Audience Station 200; and a microphone 107 that may allow the user to input audio that is received in the Audience Station as the audio output of the digital character. The User Station 100 may also include a sensor 108 (not shown in FIG. 1A) to receive signals from a camera 201 that may be located in the Audience Station 200.

As shown in FIG. 1B, in some embodiments, components of the kit and method that are present in the Audience Station 200 may include at least a receiver 201, an electronic visual display 202, a camera 203, a microphone 204, and a speaker 205. The electronic visual display 202 may allow an audience to see and interact with a digital character or avatar that is being controlled by the user (who may be invisible to the audience) in real time. Non-limiting examples of the electronic visual display 202 may include a MicroTile video display system, a Television Set, a Smart TV, a computer, a mobile computing device, a smartphone, or any comparable electronic visual display. The camera 203 that is placed in the Audience Station 200 may act as the "eyes" of the user and provide a real-time video feed of the audience to the user such that the user can see the actions of the audience and react to those actions in real time. The camera 203 may include a web camera or any device with real-time video capability. The microphone 204 may allow the audience to speak to the digital character in real time such that when the audience speaks the invisible user controlling the digital character from the User Station 100 (FIG. 1A) can immediately hear the audience and respond to the audience such that it appears that the digital character is responding to and interacting directly to the audience. The speaker 205 may allow the audience to hear the audio input of the invisible user as the audio output of the digital character in real time. The camera 203, microphone 204, and speaker 205, may be integrated with the electronic visual display 202. The receiver 201 may receive relevant inputs from the User Station 100 and Audience Station 200 including the transmitter 106. (FIGS. 1A and 1B).

Figure 2A:
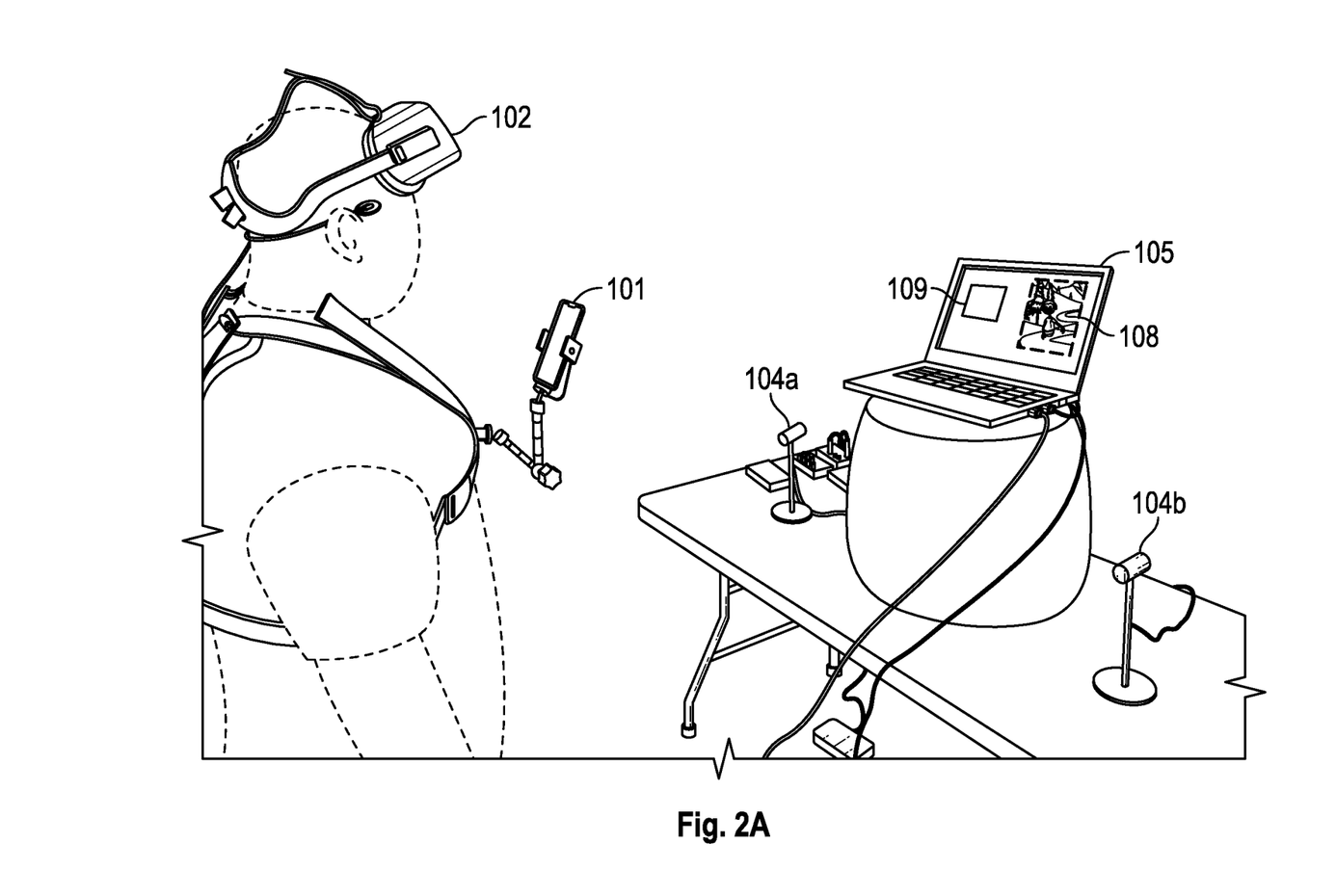
Figure 2B:
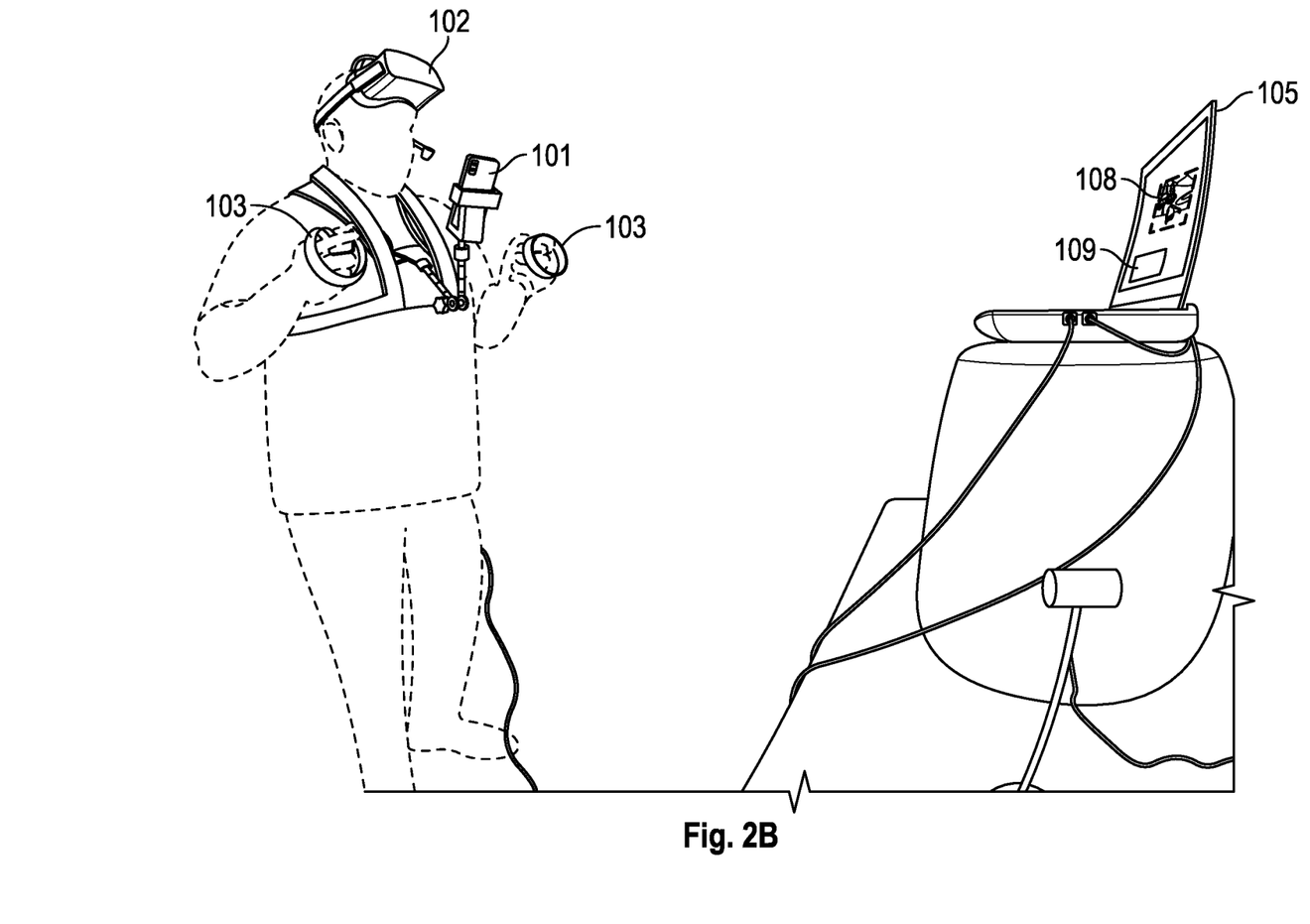

In accordance with one or more embodiments of the present disclosure, FIGS. 2A and 2B further depict illustrative components of a User Station 100 (FIG. 1A). As shown in FIGS. 2A and 2B, in some embodiments, the mobile computing device 101 may be held at a predetermined distance from the face of the user through various methods. In one embodiment, the mobile computing device 101 may be physically supported at a predetermined distance from the user's face in the holder of a selfie stick that may be configured to be attached to a vest.

As shown in FIG. 2B, in some embodiments, the controllers 103 may be held in each hand of a user and may be configured to be tracked by sensors 104a and 104b (FIG. 1A). Sensors 104a and 104b may also be capable of tracking the movements of headset 102. (FIGS. 1A, 1B, 2A and 2B.) Each of controllers 103 may include several buttons, triggers, and controls that may also be configured to control certain actions of the digital character. (FIGS. 1A, 1B, 2A and 2B.) Sensors 104a and 104b may be set up at a predetermined distance from each other and from an integration computing device 105, and when in operation, a user may operate sensors 104a and 104b, controllers 103, and headset 102 within a predetermined physical boundary (such as a portion of a room) within which sensors 104a and 104b can sense controllers 103, headset 102, or the user's body movements. (FIGS. 1A, 1B, 2A and 2B.)

As shown in FIGS. 1A, 1B, 2A and 2B, sensors 104a and 104b for controller 103 and headset 102 may be placed at a predetermined distance from an integration computing device 105 and the user. In one embodiment, integration computing device 105 and sensors 104a and 104b may be mounted on a movable rack such that re-calibration of the system is not required when the rack is moved. For example, sensors 104a and 104b may be attached to and/or held in place by movable mechanical "arms" attached to the rack and folded out of the rack at predetermined angles, and subsequently locked into place during operation of the system, such that when the rack is moved during operation, there is no need to re-calibrate either the sensors 104a and 104b or the application (e.g., Oculus™-like type application) that is running on the integration computing device 105. The movable mechanical arms holding sensors 104a and 104b may be folded back into the rack when the system is not in operation.

The user's facial expressions may be tracked by the mobile computing device 101 which may be held at a predetermined distance from the user's face by a selfie stick and may be attached to a vest.

Figure 3A:
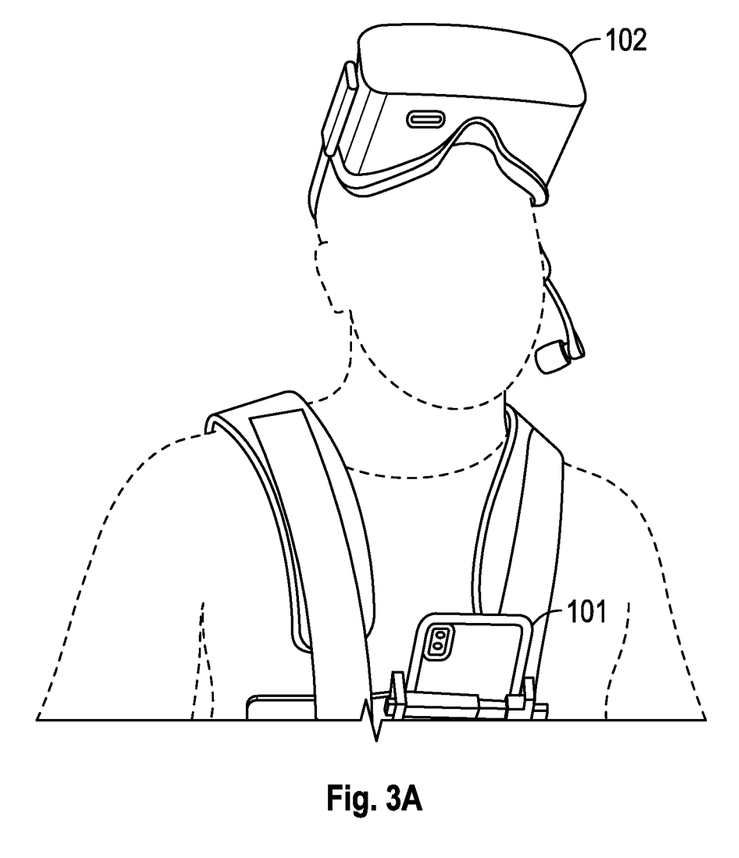
Figure 3B:
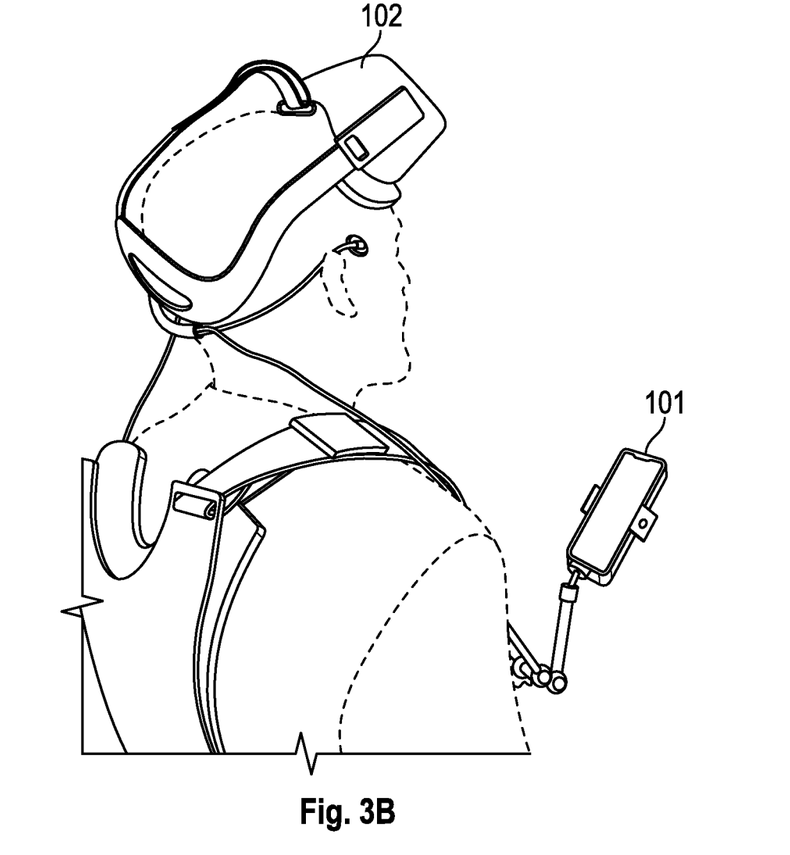

In accordance with at least some embodiments of the present disclosure, FIGS. 3A and 3B depict the front and side-view of a user who may wear headset 102 (FIG. 1A) at an angle to the user's forehead.

In accordance with one or more embodiments of the present disclosure, an example of an animated digital character, nicknamed DJ Bee™ whose body motions and facial expressions may be controlled in accordance with the principles of the present invention and which is used to teach children about money including whether to save, spend, or share. In some embodiments, the DJ Bee™ character may be presented to a user on a user interface/electronic visual display/computer screen of integration computing device 105 (FIGS. 1A, 1B, 2A and 2B) and/or on electronic visual display 202 (FIG. 1B) that may be controlled in accordance with the principles of this disclosure.

An example of one of the embodiments of the present disclosure may comprise the following. To begin the presentation/performance, a greeter may welcome an audience comprising children to an Audience Station that is equipped with an electronic visual display 202, a microphone 204, a speaker 205, a web camera 203, and a receiver 201 in accordance with the principles of this invention. (FIG. 1B). The audience may be positioned in front of electronic visual display 202 and web camera 203 (FIG. 1B) and may be prompted by the greeter to call for DJ Bee™ to appear. In response, the animated DJ Bee™ character may appear on the electronic visual display 202 (FIG. 1B) and interacts with the audience in real time. Based on the placement of the web camera 201, microphone 204 and speaker 205 at the Audience Station (FIG. 1B), DJ Bee™ is able to "see, hear and talk to" the audience in real time and react to anything related to the audience in real time (although in reality, it is actually the invisible user controlling the digital character from User Station 100 (FIGS. 1A, 1B, 2A, 2B, 3A, and 3B) who is interacting with the audience). Since the user and User Station 100 (FIGS. 1A, 1B, 2A, 2B, 3A, and 3B) remains invisible to the audience throughout the presentation, this real-time interaction with a digital character on an electronic visual display 202 (in Audience Station 200) (FIG. 1B) that has natural human body movements and facial expressions appears surprising to the audience since the audience may not be used to interacting with an animated digital character on an electronic visual display in such a conversational and ordinary way. As described above, this interaction, which appears as magic to the audience is in fact, a carefully orchestrated mapping of a behind-the-scenes user's body and hand motions and facial expressions to the digital character's body (including hands) and facial expressions in real time in accordance with the principles of this invention.

Behind the scenes (for example, in a separate room), a user may operate the system and method in a User Station 100 (FIGS. 1A, 1B, 2A, 2B, 3A, and 3B) in accordance with the principles of this invention such that the user's body movements and facial expressions are tracked and mapped onto the animated character. As an example, when the system is in operation, the user may wear a headset 102 on the user's forehead (FIGS. 2A, 2B, 3A, and 3B); and may hold and control a controller 103 in each hand (FIGS. 1A and 2B). The user's body, hand and head motions may be tracked by the sensors 104a and 104b at the User Station (FIGS. 1A, 2A, 2B, 3A, and 3B) and mapped in real-time onto DJ Bee's™ body, hand and head motions. A non-limiting example of a headset, controllers and sensors in accordance with one embodiment of this invention is an Oculus Rift™ virtual reality headset, controllers, and sensors made by Oculus VR.

With the aid of the video-feed supplied by camera 203 (FIG. 1B), the user in User Station 100 sees the actions of the audience on the user interface of the integration computing device 105 and speaks to the audience through a microphone 107 at the User Station (FIGS. 1A, 2A, 2B, 3A, and 3B). The user's facial expressions may be tracked by an application or software on a mobile computing device 101 that may be held at a predetermined distance from the user's face and mapped onto DJ Bee's™ face as DJ Bee's™ facial expressions in real time. A non-limiting example of a mobile computing device may be an iPhone X™ operating an ARKit™ software application (Apple, Inc., CA).

In one embodiment, mobile computing device 101 may be held at a predetermined distance from the user's face in the holder of a selfie-stick that may be attached to a vest worn on the user's body (see, e.g., FIGS. 2A, 2B, 3A, and 3B). In another embodiment, mobile computing device 101 may be held at a predetermined distance from the user's face in a holder on a rig that is configured to be worn on the user's body. In one embodiment, the rig may conclude PVC pipes and a body suit. In another embodiment the rig may be a vest that is configured to be worn on the user's body and to hold the selfie stick such that the mobile computing device can track the user's facial expressions closely and regardless of the user's movements. (See., e.g., FIGS. 2A, 2B, 3A, and 3B).

The advantages of the system and method disclosed herein over existing systems include the following: the present invention is a relatively inexpensive kit and method with natural and intuitive controls, that is easy to set up, and which is readily available to an ordinary consumer to capture both the body and facial expressions of a user in a seamless way to control the body and facial expressions of a digital character in real time, with no additional training required for the user. The system and method are based on the user's natural and fluid real-life movements expressions, not gestures or partial gestures, and enables non-technical people to control a digital character in real time. Further, the system disclosed herein does not need a set of pre-defined microposes to operate. It is therefore easier and faster to substitute in different avatars into this system using other 3D models and rigs. This system and method do not also need to map interactor gestures; instead the user and avatars movements are natural and intuitive based on natural body movements, therefore no extra preparation time is required to set up this system.

In addition, all actions take place in real-time and do not require any post-production clean up. In contrast to certain existing solutions, the system and method disclosed herein is able to handle raw motion capture and the transmission of a substantial amount of network data to control a digital character over a wired or a wireless connection. Due to the positioning of the mobile computing and the use of the facial tracking and mapping software at a predetermined distance from the user's face throughout operation in some embodiments, the system is able to capture the entire facial expression of the user including the user's eyes regardless of how the user moves including whether the user sits, stands, or places their head on a chair. Further, this system does not have a need for reflective markers for spatial reference and there is no problem with occlusion by markers by the user's body since the system does not rely on the use markers. There is also no need for a user to interact with or control unwieldy puppets in order to attempt to control a digital character and there is no need for several puppeteers and an actor to work together to control various aspects of a single digital character. The cognitive load of the user is limited as the user no longer needs to worry about controlling a puppet and following a complex story line at the same time but is instead free to naturally move around predetermined boundary in exactly the way the user desires.

At least some aspects of the present disclosure will now be described with reference to the following numbered clauses.

1. A kit comprising:
    a body-motion capture system comprising:
        a headset configured to be worn on a head of a user;
        at least one motion-detection sensor located at a predetermined distance from the user to track at least one head or body motion of the user;
        at least one controller configured to control at least one head or body motion of a digital character;
    wherein the body-motion capture system is configured to:
        track and capture motion data relating to at least one head or body motion of a user; and
        control at least one head or body motion of a digital character in real time based, at least in part, on the captured motion data;
        wherein the at least one head or body motion of the digital character corresponds to the at least one head or body motion of the user;
    a mobile computing device configured to:
        track and capture facial expression data relating to at least one facial expression of the user, and
        control at least one facial expression of the digital character in real time based, at least in part, in the captured facial expression data;
        wherein the at least one facial expression of the digital character corresponds to the at least one facial expression of the user;
    a microphone configured to:
        capture an audio output of the user, and
        control an audio output of the digital character in real-time based, at least in part, on the captured audio output;
        wherein the audio output of the digital character corresponds to the audio output of the user;
    an integration computing device that is configured to integrate the audio output, the motion data and the facial expression data to control the audio output, the motion, and the facial expression of the digital character;
    a vest configured to be worn on a body of the user; and
    a structural member attached to the vest;
        wherein the structural member is configured to hold the mobile computing device at a predetermined distance from a face of the user so that the mobile computing device can track and capture the at least one facial expression of the user.

2. The kit of clause 1, wherein the headset is configured to be worn on a forehead of the user.
3. The kit of clause 1, wherein the headset is configured to be worn on a forehead of the user at an angle of 15 to 45 degrees above eyes of a user.
4. The kit of clause 1, wherein the headset is configured to be worn on a forehead of the user at an angle of 20 to 35 degrees above eyes of a user.
5. The kit of clause 1, wherein the headset is a virtual reality headset.
6. The kit of clause 1, wherein the mobile computing device is a mobile phone.
7. The kit of clause 1, wherein the structural member attached to the vest is a selfie-stick.
8. The kit of clause 1, wherein the headset is a virtual reality headset, the mobile computing device is a mobile phone, and the structural member attached to the vest is a selfie-stick.
9. The kit of clause 1, wherein at least one controller is held in a hand of a user.
10. The kit of clause 9, wherein the at least one motion-detection sensor tracks the at least one controller held in the hand of the user.
11. The kit of clause 10, wherein the at least one motion-detection sensor tracks at least the headset and the at least one controller held in each hand of the user.
12. A method comprising:
    receiving motion data relating to at least one head motion of a user from a headset and from at least one sensor configured to track and capture at least one motion of a head of a user;
    receiving motion data relating to at least one body motion of a user from at least one controller and from at least one sensor configured to track and capture at least one motion of a body of the user;
    receiving facial-expression data relating to at least one facial expression of a user from a mobile computing device configured to track and capture at least one facial expression of the user;
    receiving audio output from a microphone configured to capture an audio output of a user;
    integrating the received head and body-motion data and facial-expression data to control at least one head, body motion, and facial expression of a digital character in real time based, at least in part, on the received motion and facial expression data such that the at least one head, body motion, or facial expression of the digital character corresponds to the at least one head, body motion, or facial expression of a user; and
    integrating the received audio output to control an audio output of the digital character in real-time based, at least in part, on the received audio output; such that the audio output of the digital character corresponds to the audio output of a user.

13. The method of clause 12, wherein the motion data relating to at least one head motion of a user is received from at least tracking a headset configured to be worn on a forehead of a user.
14. The method of clause 12, wherein the motion data relating to at least one head motion of a user is received from at least tracking a headset configured to be worn on a forehead of a user at an angle of 15 to 45 degrees above eyes of a user.
15. The method of clause 12, wherein the motion data relating to at least one head motion of a user is received from at least tracking a headset configured to be worn on a forehead of a user at an angle of 20 to 35 degrees above eyes of a user.
16. The method of clause 12, wherein the motion data relating to at least one head motion of a user is received from at least tracking a virtual reality headset.
17. The method of clause 12, wherein the facial-expression data relating to at least one facial expression of a user is received from at least a mobile phone.
18. The method of clause 12, wherein the motion data relating to at least one head motion of a user is received from at least tracking a virtual reality headset, and wherein the facial-expression data is received from at least a mobile phone.
19. The method of clause 12, wherein the motion data relating to at least one head motion of a user is received from at least a plurality of sensors, and wherein the facial-expression data relating to at least one facial expression of a user is received from at least a mobile phone.
20. A kit comprising:
a body-motion capture system comprising:
a headset configured to be worn on a head of a user;
at least one motion-detection sensor located at a predetermined distance from the user to track at least one head or body motion of the user;
at least one controller configured to control at least one head or body motion of a digital character;
wherein the body-motion capture system is configured to:
track and capture motion data relating to at least one head or body motion of a user; and
control at least one head or body motion of a digital character in real time based, at least in part, on the captured motion data;
wherein the at least one head or body motion of the digital character corresponds to the at least one head or body motion of the user;
a mobile computing device configured to:
track and capture facial expression data relating to at least one facial expression of the user, and
control at least one facial expression of the digital character in real time based, at least in part, in the captured facial expression data;
wherein the at least one facial expression of the digital character corresponds to the at least one facial expression of the user;
a microphone configured to:
capture an audio output of the user, and
control an audio output of the digital character in real-time based, at least in part, on the captured audio output;
wherein the audio output of the digital character corresponds to the audio output of the user;
an integration computing device that is configured to integrate the audio output, the motion data and the facial expression data to control the audio output, the motion, and the facial expression of the digital character; and
an apparatus worn on the body of the user and configured to hold the mobile computing device at a predetermined distance from a face of the user so that the mobile computing device can track and capture the at least one facial expression of the user regardless of the movement of the user.

Any publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:
1. A system, comprising:
a first display to present a video output and an audio output of a digital character to an audience;
at least one mobile computing device that is configured at least to:
capture, in real time, motion data related to at least one head or body motion of a user, and
capture, in real-time, facial expression data related to at least one facial expression of the user;
a microphone configured to capture the audio output of the user;
wherein the audio output of the digital character through the first display corresponds to the audio output of the user; and
at least one processor that is configured to execute a software application that causes the at least one processor to:
receive the motion data of the user and the facial expression data of the user;
render the motion data, the facial expression data, or both of the user into at least one motion of the digital character, at least one facial expression of the digital character, or both, that control, in real-time, the at least one head or body motion, the at least one facial expression, or both, of the digital character presented in the video output of the digital character to the audience; and
display on a second display to the user, a real-time video feed of the audience captured by a video camera to cause a real-time interaction between the audience and the digital character controlled by the user.
2. The system of claim 1, further comprising:
a vest configured to be worn on a body of the user;
a structural member attached to the vest;
wherein the structural member is configured to hold the at least one mobile computing device at a predetermined distance from a face of the user so that the at least one mobile computing device captures the at least one facial expression of the user.
3. The system of claim 2, wherein the structural member attached to the vest is a selfie-stick.

4. The system of claim 1, further comprising at least one controller; and wherein the at least one controller is held in a hand of a user.

5. The system of claim 4, wherein the at least one controller comprises at least one button, at least one trigger, at least one control, or any combination thereof for controlling actions of the digital character.

6. The system of claim 4, wherein the at least one mobile computing device is further configured to capture, in real time, the motion data related to at least one motion of the at least one controller.

7. The system according to claim 1, further comprising a movable rack and at least one motion-detection sensor; and wherein the at least one motion-detection sensor and the at least one processor are locked on the movable rack at fixed positions to prevent recalibrating the software application, the at least one motion-detection sensor, or both, when the movable rack is moved.

8. The system according to claim 1, further comprising an audience station.

9. The system according to claim 8, wherein the audience station comprises the first display, an audience station microphone, an audience station speaker, and the video camera; and wherein the audience is positioned in front of the first display and the video camera.

10. The system according to claim 1, further comprising a Virtual Reality headset configured to be worn on a forehead of the user; and wherein the at least one mobile computing device is further configured to capture, in real time, the motion data related to at least one motion of the Virtual Reality headset.

11. The system according to claim 10, further comprising an integration computing device.

12. The system according to claim 11, wherein the integration computing device is configured to integrate the audio output, the motion data and the facial expression data of the user to control the audio output, the at least one head or body motion, and the at least one facial expression of the digital character.

13. The system according to claim 1, further comprising at least one motion-detection sensor configured to capture the motion data related to at least one motion of a Virtual Reality Headset, at least one head or body motion of the user, at least one motion of at least one controller, or any combination thereof.

14. The system according to claim 1, wherein the at least one mobile computing device is a smartphone, and wherein the microphone is located within the smartphone.

15. A method, comprising:
receiving, by at least one processor, an audio output of a user from a microphone;
  wherein the audio output of a digital character corresponds to the audio output of the user;
receiving, by the at least one processor, motion data of a user, facial expression data of the user, or both captured from at least one mobile computing device;
  wherein the motion data is related to at least one head or body motion of the user;
  wherein the facial expression data related to at least one facial expression of the user;
rendering, by the at least one processor, the motion data, the facial expression data, or both of the user into at least one motion of the digital character, at least one facial expression of the digital character, or both, that control, in real-time, the at least one head or body motion, the at least one facial expression, or both, of the digital character presented in a video output of the digital character to an audience;
displaying, by the at least one processor, on a first display, the video output and the audio output of the digital character to the audience; and
displaying, by the at least one processor, on a second display to the user, a real-time video feed of the audience captured by a video camera to cause a real-time interaction between the audience and the digital character controlled by the user.

16. The method of claim 15, wherein the receiving of the motion data captured from the at least one mobile computing device comprises receiving motion data from at least one controller held in a hand of the user.

17. The method of claim 16, further comprising controlling, by the at least one processor, actions of the digital character through at least one button, at least one trigger, at least one control, or any combination thereof of the at least one controller.

18. The method of claim 15, wherein the receiving of the motion data captured from the at least one mobile computing device comprises receiving motion data of a Virtual Reality headset configured to be worn on a forehead of the user.

19. The method according to claim 15, further comprising receiving, by the at least one processor, the motion data captured from at least one motion-detection sensor.

20. The method according to claim 19, wherein the receiving of the motion data by the at least one motion-detection sensor comprises receiving the motion data related to a motion of a Virtual Reality Headset, the at least one head or body motion of the user, at least one motion of at least one controller, or any combination thereof.

* * * * *